(12) United States Patent
Colja et al.

(10) Patent No.: US 8,382,204 B2
(45) Date of Patent: Feb. 26, 2013

(54) MODULAR CONTOUR SUPPORT APPARATUS

(75) Inventors: Renato Colja, Windsor (CA); Stephen M. Certossi, Belle River (CA); Horia Blendea, LaSalle (CA); Iulian Mitea, Windsor (CA); Robert J. McMillen, Tecumseh (CA)

(73) Assignee: Schukra of North America Co., Tecumseh, Ontario (CA)

( * ) Notice: Subject to any disclaimer, the term of this patent is extended or adjusted under 35 U.S.C. 154(b) by 0 days.

(21) Appl. No.: 13/188,753

(22) Filed: Jul. 22, 2011

(65) Prior Publication Data

US 2011/0278891 A1  Nov. 17, 2011

Related U.S. Application Data

(62) Division of application No. 11/572,628, filed as application No. PCT/US2005/027051 on Jul. 29, 2005, now Pat. No. 7,984,948.

(60) Provisional application No. 60/592,891, filed on Jul. 30, 2004.

(51) Int. Cl.
*A47C 3/00* (2006.01)
(52) U.S. Cl. ............... 297/284.7; 297/284.1; 297/284.4
(58) Field of Classification Search ............... 297/284.1, 297/284.4, 284.7
See application file for complete search history.

(56) References Cited

U.S. PATENT DOCUMENTS

| | | | |
|---|---|---|---|
| 1,182,854 A | 5/1916 | Poler | |
| 1,203,293 A | 10/1916 | Wilkinson | |
| 2,274,176 A | 2/1942 | Widman | |
| 2,756,809 A | 7/1956 | Endresen | |
| 2,833,339 A | 5/1958 | Lilijengren | |
| 2,843,195 A | 7/1958 | Barvaeus | |
| 2,855,984 A | 10/1958 | Majorana et al. | |
| 2,942,651 A | 6/1960 | Binding | |
| 3,121,585 A | 2/1964 | Krueger et al. | |
| 3,202,453 A | 8/1965 | Richards | |
| 3,241,879 A | 3/1966 | Castello et al. | |
| 3,246,924 A | 4/1966 | Krueger et al. | |
| 3,271,076 A | 9/1966 | Smith | |
| 3,273,877 A | 9/1966 | Geller et al. | |
| 3,363,941 A | 1/1968 | Wierwille | |
| 3,378,299 A | 4/1968 | Sandor | |
| 3,416,839 A | 12/1968 | Flint | |
| 3,490,084 A | 1/1970 | Schuster | |
| 3,492,768 A | 2/1970 | Schuster | |
| 3,550,953 A | 12/1970 | Neale | |
| 3,695,688 A | 10/1972 | Wize | |
| 3,724,144 A | 4/1973 | Schuster | |
| 3,762,769 A | 10/1973 | Poschl | |
| 3,927,911 A | 12/1975 | Rosquist | |
| 3,929,374 A | 12/1975 | Hogan et al. | |

(Continued)

FOREIGN PATENT DOCUMENTS

| AT | 401497 | 9/1996 |
|---|---|---|
| DE | 2040794 | 7/1971 |

(Continued)

*Primary Examiner* — David Dunn
*Assistant Examiner* — Erika Garrett
(74) *Attorney, Agent, or Firm* — Michael Best & Friedrich LLP

(57) ABSTRACT

A four way lumbar support for an automobile seat includes a wire array, a fixed frame, and a basculating arm. When in its extended position, the basculating arm exerts pressure on the wire array thus providing lumbar support to the seat occupant at that point. A system of cables and sliding connections allows the basculating arm to slide along the fixed frame so that the lumbar support may be provided at different heights within the seat.

16 Claims, 4 Drawing Sheets

U.S. PATENT DOCUMENTS

| | | |
|---|---|---|
| 3,938,858 A | 2/1976 | Drabert et al. |
| 3,967,852 A | 7/1976 | Eiselt et al. |
| 3,983,640 A | 10/1976 | Cardullo et al. |
| 3,992,059 A | 11/1976 | Kloepfer |
| 4,040,661 A | 8/1977 | Hogan et al. |
| 4,050,331 A | 9/1977 | Braren et al. |
| 4,105,245 A | 8/1978 | Simons et al. |
| 4,136,577 A | 1/1979 | Borgersen |
| 4,153,293 A | 5/1979 | Sheldon |
| 4,155,592 A | 5/1979 | Tsuda et al. |
| 4,156,544 A | 5/1979 | Swenson et al. |
| 4,182,533 A | 1/1980 | Arndt et al. |
| 4,190,286 A | 2/1980 | Bentley |
| 4,295,681 A | 10/1981 | Gregory |
| 4,313,637 A | 2/1982 | Barley |
| 4,316,631 A | 2/1982 | Lenz et al. |
| 4,354,709 A | 10/1982 | Schuster |
| 4,368,916 A | 1/1983 | Blasin |
| 4,390,210 A | 6/1983 | Wisniewski et al. |
| 4,428,611 A | 1/1984 | Widmer |
| 4,449,751 A | 5/1984 | Murphy et al. |
| 4,452,485 A | 6/1984 | Schuster |
| 4,465,317 A | 8/1984 | Schwarz |
| 4,519,646 A | 5/1985 | Leitermann et al. |
| 4,541,670 A | 9/1985 | Morgenstern et al. |
| 4,555,140 A | 11/1985 | Nemoto |
| 4,556,251 A | 12/1985 | Takagi |
| 4,564,235 A | 1/1986 | Hatsutta et al. |
| 4,565,406 A | 1/1986 | Suzuki |
| 4,576,410 A | 3/1986 | Hattori |
| 4,601,514 A | 7/1986 | Meiller |
| 4,602,819 A | 7/1986 | Morel |
| 4,616,874 A | 10/1986 | Pietsch et al. |
| 4,619,481 A | 10/1986 | Grudzinskas |
| 4,627,661 A | 12/1986 | Ronnhult et al. |
| 4,630,865 A | 12/1986 | Ahs |
| 4,632,454 A | 12/1986 | Naert |
| 4,634,083 A | 1/1987 | McKinnon |
| 4,655,505 A | 4/1987 | Kashiwamura et al. |
| 4,676,550 A | 6/1987 | Neve De Mevergnies |
| 4,679,848 A | 7/1987 | Spierings |
| 4,699,418 A | 10/1987 | Plavetich |
| 4,707,027 A | 11/1987 | Horvath et al. |
| 4,711,490 A | 12/1987 | Brand |
| 4,730,871 A | 3/1988 | Sheldon |
| 4,768,830 A | 9/1988 | Musselwhite |
| 4,826,249 A | 5/1989 | Bradbury |
| 4,833,614 A | 5/1989 | Saitoh et al. |
| 4,834,455 A | 5/1989 | Proctor |
| 4,880,271 A | 11/1989 | Graves |
| 4,909,568 A | 3/1990 | Dal Monte |
| 4,915,448 A | 4/1990 | Morgenstern |
| 4,918,344 A | 4/1990 | Chikamori et al. |
| 4,950,032 A | 8/1990 | Nagasaka |
| 4,957,102 A | 9/1990 | Tan et al. |
| 4,968,093 A | 11/1990 | Dal Monte |
| 4,976,104 A | 12/1990 | Morris et al. |
| 5,005,904 A | 4/1991 | Clemens et al. |
| 5,022,709 A | 6/1991 | Marchino |
| 5,026,116 A | 6/1991 | Dal Monte |
| 5,050,930 A | 9/1991 | Schuster et al. |
| 5,076,643 A | 12/1991 | Colasanti et al. |
| 5,082,326 A | 1/1992 | Sekido et al. |
| 5,088,790 A | 2/1992 | Wainwright et al. |
| 5,092,654 A | 3/1992 | Inaba et al. |
| 5,120,111 A | 6/1992 | Cook |
| 5,137,329 A | 8/1992 | Neale |
| 5,174,526 A | 12/1992 | Kanigowski |
| 5,195,795 A | 3/1993 | Cannera et al. |
| 5,197,780 A | 3/1993 | Coughlin |
| 5,215,350 A | 6/1993 | Kato |
| 5,217,278 A | 6/1993 | Harrison et al. |
| 5,269,581 A | 12/1993 | Odagaki et al. |
| 5,286,087 A | 2/1994 | Elton |
| 5,292,175 A | 3/1994 | Artz |
| 5,292,176 A | 3/1994 | Artz |
| 5,299,851 A | 4/1994 | Lin |
| 5,316,371 A | 5/1994 | Bishai |
| 5,335,965 A | 8/1994 | Sessini |
| 5,368,355 A | 11/1994 | Hayden et al. |
| 5,385,389 A | 1/1995 | Bishai |
| 5,385,531 A | 1/1995 | Jover |
| 5,397,164 A | 3/1995 | Schuster |
| 5,397,167 A | 3/1995 | Fourrey et al. |
| 5,423,593 A | 6/1995 | Nagashima |
| 5,429,558 A | 7/1995 | Lagarde |
| 5,449,219 A | 9/1995 | Hay et al. |
| 5,452,868 A | 9/1995 | Kanigowski |
| 5,472,261 A | 12/1995 | Oplenskdal et al. |
| 5,474,358 A | 12/1995 | Maeyaert |
| 5,482,346 A | 1/1996 | Lesourd |
| 5,498,063 A | 3/1996 | Schuster et al. |
| 5,518,294 A | 5/1996 | Ligon, Sr. et al. |
| 5,529,377 A | 6/1996 | Miller |
| 5,553,917 A | 9/1996 | Adat et al. |
| 5,562,324 A | 10/1996 | Massara et al. |
| 5,567,010 A | 10/1996 | Sparks |
| 5,567,011 A | 10/1996 | Sessini |
| 5,570,931 A | 11/1996 | Kargilis et al. |
| 5,588,703 A | 12/1996 | Itou |
| 5,588,707 A | 12/1996 | Bolsworth et al. |
| 5,609,394 A | 3/1997 | Ligon, Sr. et al. |
| 5,626,390 A | 5/1997 | Schuster et al. |
| 5,638,722 A | 6/1997 | Klingler |
| 5,651,583 A | 7/1997 | Klingler et al. |
| 5,651,584 A * | 7/1997 | Chenot et al. ............... 297/284.4 |
| 5,660,438 A | 8/1997 | Tedesco |
| 5,681,079 A | 10/1997 | Robinson |
| 5,704,687 A | 1/1998 | Klingler |
| 5,718,476 A | 2/1998 | De Pascal et al. |
| 5,730,495 A | 3/1998 | Tuman, II |
| 5,758,925 A | 6/1998 | Schrewe et al. |
| 5,762,397 A | 6/1998 | Venuto et al. |
| 5,769,491 A | 6/1998 | Schwarzbich |
| 5,772,281 A | 6/1998 | Massara |
| 5,775,773 A | 7/1998 | Schuster et al. |
| 5,791,733 A | 8/1998 | Van Hekken et al. |
| 5,816,653 A | 10/1998 | Benson |
| 5,823,620 A | 10/1998 | Le Caz |
| 5,857,743 A | 1/1999 | Ligon, Sr. et al. |
| 5,868,466 A | 2/1999 | Massara et al. |
| 5,884,968 A | 3/1999 | Massara |
| 5,897,168 A | 4/1999 | Bartelt et al. |
| 5,911,477 A | 6/1999 | Mundell et al. |
| 5,913,569 A | 6/1999 | Klingler |
| 5,913,590 A | 6/1999 | Backus |
| 5,934,752 A | 8/1999 | Klingler |
| 5,941,602 A | 8/1999 | Sturt et al. |
| 5,967,608 A | 10/1999 | Van Sickle |
| 5,975,632 A | 11/1999 | Ginat |
| 5,984,407 A | 11/1999 | Ligon, Sr. et al. |
| 5,988,745 A | 11/1999 | Deceuninck |
| 6,003,941 A | 12/1999 | Schuster, Sr. et al. |
| 6,007,151 A | 12/1999 | Benson |
| 6,030,041 A | 2/2000 | Hsiao |
| 6,036,265 A | 3/2000 | Cosentino |
| 6,045,185 A | 4/2000 | Ligon, Sr. et al. |
| 6,050,641 A | 4/2000 | Benson |
| 6,079,783 A | 6/2000 | Schuster, Sr. et al. |
| 6,092,871 A | 7/2000 | Beaulieu |
| 6,152,531 A | 11/2000 | Deceuninck |
| 6,152,532 A | 11/2000 | Cosentino |
| 6,158,300 A | 12/2000 | Klingler |
| 6,174,017 B1 | 1/2001 | Salani et al. |
| 6,199,951 B1 | 3/2001 | Zeile et al. |
| 6,227,617 B1 | 5/2001 | Von Möller |
| 6,227,618 B1 | 5/2001 | Ligon, Sr. et al. |
| 6,254,186 B1 | 7/2001 | Falzon |
| 6,254,187 B1 | 7/2001 | Schuster, Sr. et al. |
| 6,270,158 B1 | 8/2001 | Hong |
| 6,296,308 B1 | 10/2001 | Cosentino et al. |
| 6,334,651 B1 | 1/2002 | Duan et al. |
| 6,338,530 B1 * | 1/2002 | Gowing ................... 297/284.4 |
| 6,371,558 B1 | 4/2002 | Couasnon |
| 6,375,255 B1 | 4/2002 | Maruta et al. |
| 6,554,360 B1 | 4/2003 | Wilke et al. |
| 6,616,227 B2 | 9/2003 | Blendea et al. |

| | | |
|---|---|---|
| 6,648,395 B2 | 11/2003 | Hoshino |
| 6,655,738 B2 | 12/2003 | Kämmerer |
| 6,669,299 B2 | 12/2003 | Carlson et al. |
| 6,682,144 B2 * | 1/2004 | Klingler .................. 297/284.4 |
| 6,695,402 B2 | 2/2004 | Sloan, Jr. |
| 6,736,459 B1 | 5/2004 | Sturt |
| 6,776,743 B2 * | 8/2004 | Hur ............................ 482/140 |
| 6,860,374 B2 | 3/2005 | Liu et al. |
| 6,860,561 B2 | 3/2005 | Takata |
| 6,905,170 B2 * | 6/2005 | McMillen et al. ......... 297/284.4 |
| 7,000,986 B2 | 2/2006 | Cruz Fernandes de Pinho et al. |
| 7,140,680 B2 | 11/2006 | McMillen et al. |
| 7,140,681 B2 * | 11/2006 | McMillen .................. 297/284.9 |
| 2003/0085600 A1 | 5/2003 | Mori |

FOREIGN PATENT DOCUMENTS

| | | |
|---|---|---|
| DE | 2064419 | 7/1972 |
| DE | 2947472 | 8/1980 |
| DE | 4220995 | 1/1994 |
| DE | 4412898 | 10/1995 |
| DE | 19750116 | 5/1999 |
| DE | 29905163 | 7/1999 |
| DE | 10005215 | 9/2001 |
| DE | 10314771 | 10/2004 |
| EP | 0006840 | 2/1982 |
| EP | 0169293 | 10/1988 |
| EP | 0322535 | 7/1989 |
| EP | 0518830 | 12/1992 |
| EP | 0485483 | 1/1994 |
| EP | 0434660 | 5/1995 |
| EP | 0540481 | 12/1995 |
| EP | 0662795 | 12/1996 |
| EP | 0702522 | 3/1997 |
| EP | 0696251 | 7/1997 |
| EP | 0746219 | 11/1998 |
| EP | 0797399 | 11/1998 |
| EP | 0698360 | 3/2000 |
| FR | 2596334 | 10/1987 |
| GB | 1423617 | 2/1976 |
| GB | 2013487 | 8/1979 |
| SU | 587924 | 1/1978 |
| WO | 94/25307 | 11/1994 |
| WO | 00/00064 | 1/2000 |
| WO | 01/48397 | 7/2001 |
| WO | 03/022626 | 3/2003 |
| WO | 2004/043207 | 5/2004 |
| WO | 2004/043730 | 5/2004 |

* cited by examiner

MODULAR CONTOUR SUPPORT APPARATUS

CROSS-REFERENCE TO RELATED APPLICATIONS

This is a divisional of U.S. patent application Ser. No. 11/572,628, filed Jun. 14, 2007, and published as U.S. Patent Application Publication No. 2007/0296256 on Dec. 27, 2007, which is a national stage entry of PCT/US2005/027051, filed Jul. 29, 2005, and published as WO 2006/015247 on Feb. 9, 2006, which claims priority from U.S. Provisional Patent Application No. 60/592,891 filed Jul. 30, 2004, the entire contents of each of the foregoing are hereby incorporated by reference.

BACKGROUND

This invention is in the field of lumbar supports for automobile seats.

There is a continuing need in the field of lumbar supports for seats in motor vehicles and other transportation vehicles for reducing the size of the package of components necessary to provide lumbar support, both in terms of overall volume and front to back depth of the lumbar support in a retracted position.

Car manufacturers have gradually reduced the size of the space allotted for lumbar support mechanisms in their motor vehicle seats. Normally the packaging space for lumbar support systems is around 90 mm. However, seat comfort devices such as heating and cooling mechanisms and massaging mechanisms are becoming more frequent and desirable in motor vehicle seating. As such, the space allotted for lumbar support devices has been decreased to allow for room for these other devices. In addition, manufacturers desire narrower, less bulky seats so as to increase the passenger area available to the occupants of the vehicles. Some manufacturers are requiring that the packaging space for lumbar support systems be as thin as 30 mm. This presents significant difficulties to lumbar support manufacturers as lumber support systems are typically much thicker than 30 mm.

In addition, car manufacturers are also looking to provide lumbar support in second and third row seating. These seats often are designed to have a thinner overall construction because of the need to maximize cabin space for the passengers as well as cargo room for storage. As such, there is a continuing need in the art to develop thinner lumbar support mechanisms that provide lumbar support despite the narrowed space restrictions and the other comfort devices located within the seat.

SUMMARY

It is in light of the above described needs and advantages that the present invention was developed. The present invention is a lumbar support for a seat for an automobile or other transportation vehicle with an extremely thin packaging thickness. The thickness of the various embodiments of this invention ranges from 15 mm-19 mm.

In one embodiment of the present invention, the lumbar support is a flexmat consisting of wires running transversely across guide rails. The flexmat is mounted in a fixed position within the seat back frame. A basculating arm runs horizontally across the flexmat and is mounted to a fixed frame within the lumbar support system so that when the basculating arm is moved from its retracted position to its extended position, it applies pressure on the flexmat and thus provides increased support at that position to the seat occupant. The basculating arm is also mounted to the fixed frame in such a manner that allows it to move vertically along the fixed frame to provide lumbar support to the seat occupant at varying heights.

This vertical movement is achieved through the use of a traction cable, sometimes called a Bowden cable. The Bowden cable has a sheath with a wire coaxially disposed within the sheath and sliding within it. At one end of the Bowden cable is an actuator. The actuator may be a manual device such as a hand wheel or lever, or it may be a power device such as an electric motor and gear assembly. At the other end of the traction cable, the sleeve is fixedly mounted to a bracket or other attachment and the wire, proceeding from the end opening of the sleeve, is attached to a moving component of the lumbar support system. The actuator moves the wire relative to the sleeve by pulling the wire out from the sleeve. In this invention, the actuator places traction on the traction cable thus causing the basculating arm to move vertically along the fixed frame. In one embodiment of this invention, the Bowden cable is not used to move the basculating arm in a vertical direction. Rather, this task is accomplished through the use of nuts and screws. A motor is attached to a rod such that the motor rotates the rod which in turn drives the screws in a certain direction. The basculating arm is connected to the screws via a multitude of nuts. When the screws are turned in one direction, the nuts are driven vertically up or down the screws thus causing the basculating arm to move vertically along the flexmat.

In another embodiment of this invention, the basculating arm is not used as the mechanism for creating the lumbar support. Rather, movement of the lumbar support from a retracted position to an extended position through a selectable range of intermediate positions is achieved with a Bowden cable. The Bowden cable is attached to one end of the wire array such that when the actuator puts fraction on the fraction cable, the wire array bends creating an arch in the wire array and thus providing support to the seat occupant at that point. Movement of this lumbar support system vertically along the seat frame is achieved with a separate Bowden cable. Contrary to the previous embodiments, the wire array in this embodiment, rather than the basculating arm, moves vertically along the fixed frame.

In another embodiment, a lumbar support for a transportation vehicle includes a flexmat, a basculating arm, and a double pulley. The flexmat is adapted to mount on a seat backrest frame and is extendable from a first position to a second position. The basculating arm is configured for movement along the flexmat to provide support at a plurality of heights along the flexmat. The double pulley is attached to the basculating arm such that movement of the double pulley mediates movement of the basculating arm between a retracted and an extended position. The basculating arm moves the flexmat from the first position to the second position as the basculating arm moves from the retracted to the extended position.

In another embodiment, a lumbar support for a transportation vehicle includes a flexmat, a basculating arm, an actuator, and a double pulley. The flexmat is adapted to mount on a seat backrest frame such that the flexmat may extend from a first position to a second position. The basculating arm is positionable along the flexmat, and the actuator is operable to raise and lower the basculating arm. The double pulley is attached to the basculating arm such that movement of the double pulley mediates movement of the basculating arm between a retracted and an extended position. When the basculating arm moves from the retracted to the extended position, it moves the flexmat from the first position to the second position.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION

Figure 1:
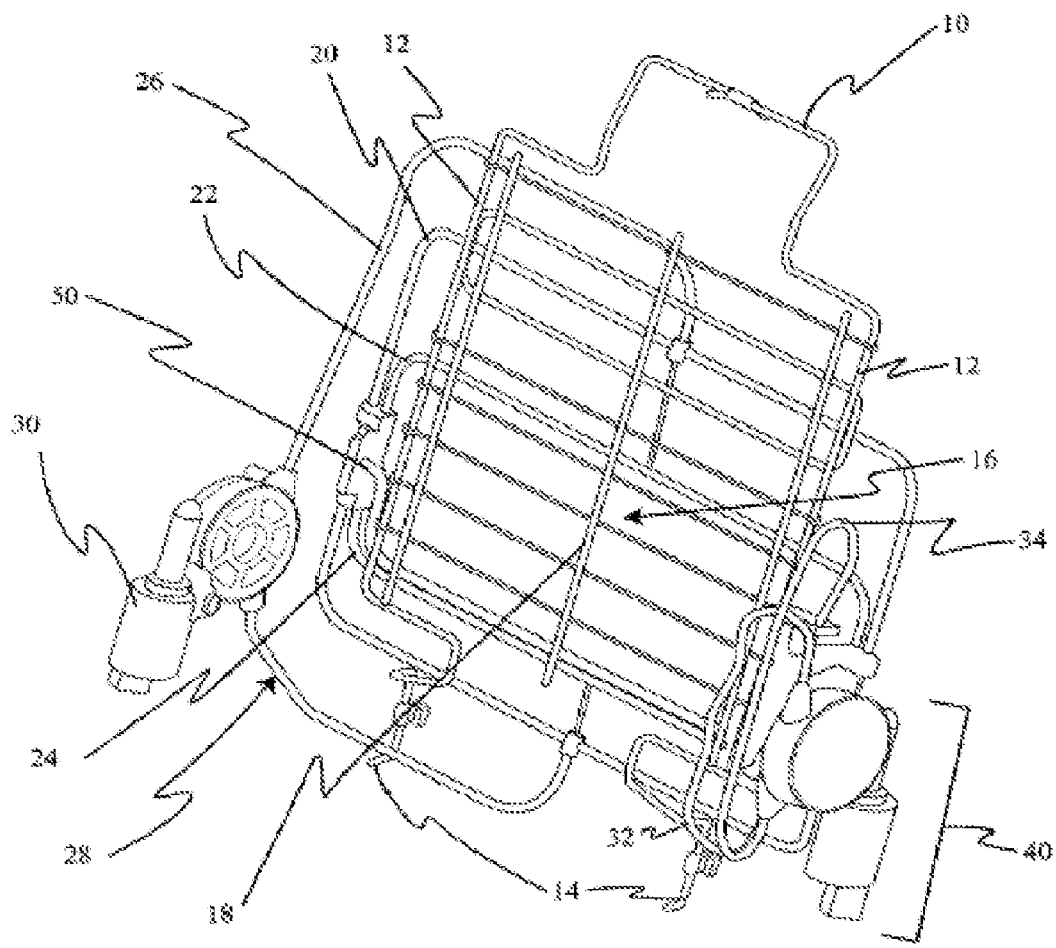
FIG. 1 is a perspective view of the lumbar support of the present invention.
Figure 2:
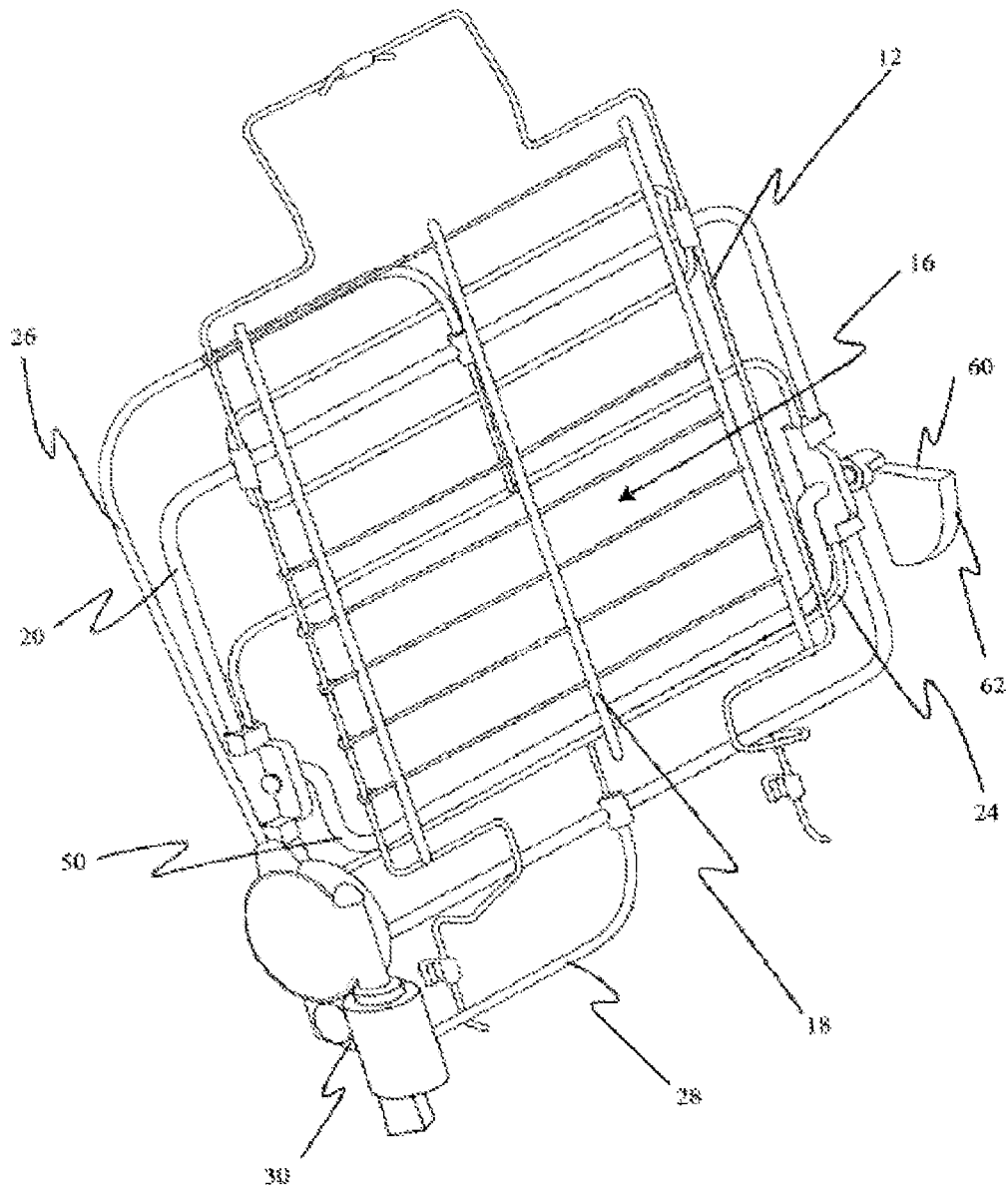
FIG. 2 is another perspective view of the lumbar support of the present invention.

Referring now to the drawings in which like reference numbers indicate like elements, FIGS. 1 and 2 depict a first embodiment of the lumbar support assembly of the present invention. The assembly is comprised generally of a flexmat 10, a fixed frame 20, an up/down actuator 30, an in/out actuator 40, a basculating arm 50, and a double pulley 60.

The flexmat assembly 10 is an assembly of components including guide rails 12, mounting hooks 14, and a wire array 16. Mounting hooks 14, which may be a bent portion of the guide rails 12, or which may be additional wires assembled with guide rails 12, are used to hook the lumbar support assembly into a mount on the seat frame. Mounting hooks 14 are adaptable to various seat frames. The wire array 16 in the depicted embodiment is composed of horizontal wires assembled between guide rails 12. The wire array 16 also has stabilizing vertical connection members 18.

The flexmat assembly 10 is attached to a fixed frame 20 such that the upper portion of the flexmat 20 is held in a relatively stable position while the lower portion is allowed to move in a direction away from the fixed frame 20 when pressure is applied by the basculating arm 50. The basculating arm 50 is slideably connected to the fixed frame 20 so that the basculating arm 50 may move substantially vertically along the fixed frame 20 in order to provide support at differing heights along the flexmat 10. Also connected to the basculating arm 50 is a raise rod 22 and a lowering rod 24.

The up/down actuator 30 powers the vertical movement of the basculating arm 50 along the fixed frame 20. The up/down actuator 30 is disposed to apply traction to a Bowden cable wire in order to slide it axially through the Bowden cable sleeve. In the depicted embodiment, the up/down actuator 30 is comprised of an electric motor and a gear housing containing the requisite components for applying the traction. Any of a variety of known power actuator gearing systems may be assembled with the lumbar support of the present invention without departing from the scope of the present invention.

The up/down actuator 30 is connected to the raise rod 22 by the up-cable 26. The up-cable 26 is a Bowden cable comprised of a cable sleeve with a wire disposed to slide through the sleeve. The raise rod 22 provides the connection point at which the wire end of the up-cable 26 is attached so that the basculating arm may be moved in an upward direction once traction is applied by the up/down actuator 30. The up/down actuator 30 is also connected to the lowering rod 24 by the down-cable 28. The down-cable 28 is also a Bowden cable comprised of a cable sleeve with a wire disposed to slide through the sleeve. The lowering rod 24 provides the connection point at which the down-cable wire end is attached so that the basculating arm 50 may be moved in a downward direction once traction is applied in the opposite direction by the up/down actuator 30.

In this embodiment, the lumbar support is provided to the seat occupant through the pressure exerted on the flexmat 10 by the basculating arm 50. The basculating arm 50 is connected to a double pulley 60. The double pulley 60 is generally wedge shaped with a rounded edge. The rounded edge contains a groove 62. Two Bowden cables, the in-cable 32 and the out-cable 34, are attached to this double pulley 60. The wire end of the in-cable 32 is attached to one end of the rounded edge of the pulley while the wire end of the out-cable is attached to the opposite end of the rounded edge. The wires of each of these cables 32 and 34 travel along groove 62. When traction is applied by in/out actuator 40 in one direction, in-cable 32 pulls pulley 60 in a downward direction causing the basculating arm 50 to move in a direction away from flexmat 10. When traction is applied by actuator 40 in an opposite direction, the out-cable 34 pulls pulley 60 in an upward direction causing the basculating arm 50 to move in a direction towards flexmat 10. Once the basculating arm 50 makes contact with the flexmat 10, any further movement towards flexmat 10 causes flexmat 10 to shift away from fixed frame 20 and thus push against the seat occupant providing the desired lumbar support at the height at which basculating arm 50 is located.

Figure 3:
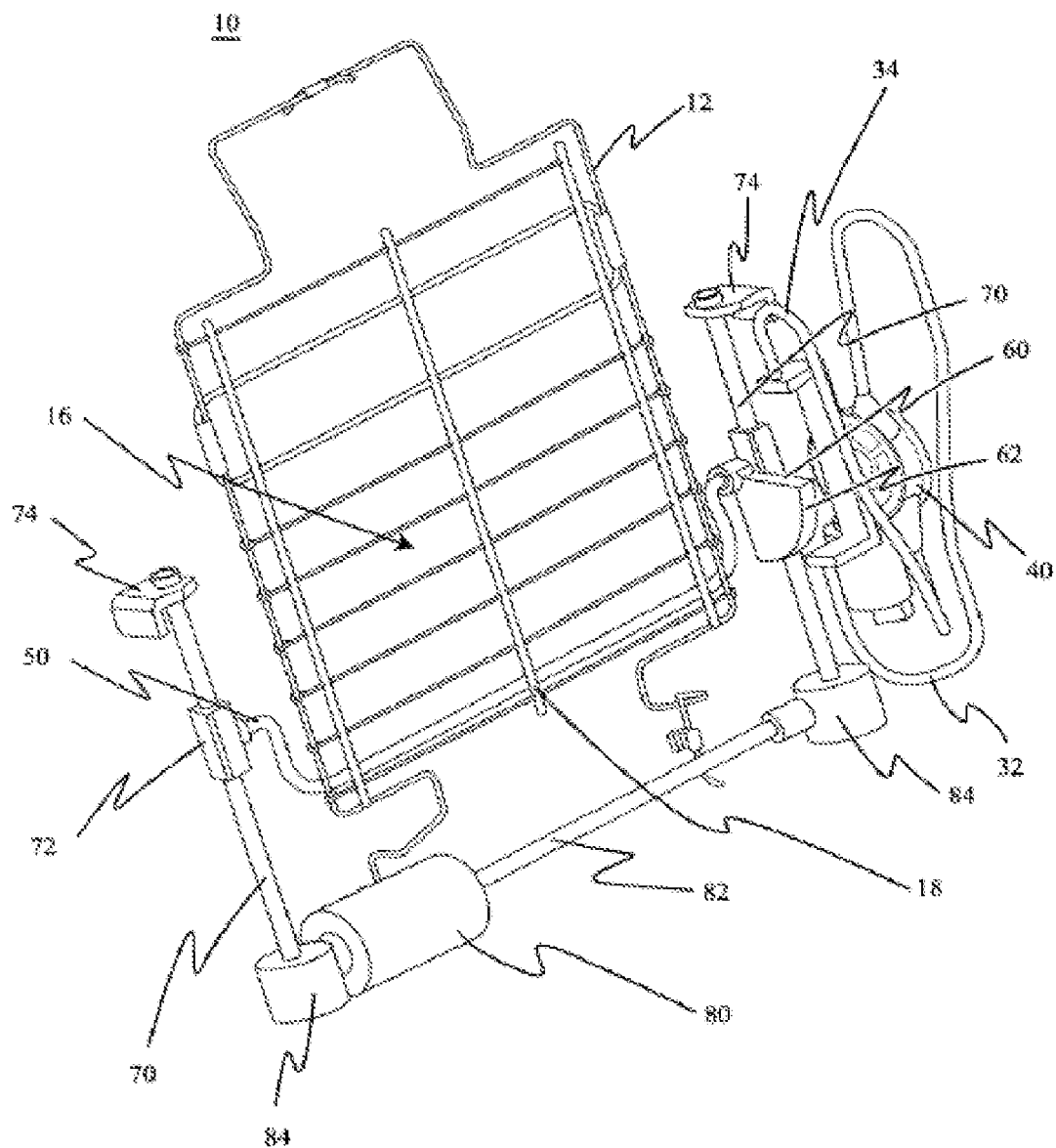
FIG. 3 is a front perspective view of another alternative embodiment of the present invention.

FIG. 3 depicts an alternative embodiment of the present invention. The mechanical aspects of the lumbar support remain substantially equivalent to the previously depicted embodiment. The lumbar support is provided through the same basculating arm 50 type mechanism of arm 50. Furthermore, double pulley 60 and in/out actuator 40 are also substantially equivalent to the previously described embodiment. In the embodiment depicted in FIG. 3, however, basculating arm 50 does not slide along a fixed frame. Rather, basculating arm 50 moves up and down two screws 70 located in fixed positions alongside flexmat 10. A motor 80 and drive rod 82 connect the two screws 70 via two separate gear housings 84. Located on each screw 70 is at least one nut 72. The nuts and screws are threaded in such a manner that when the screws 70 are turned in one direction, the nuts 72 move along the screws at the same rate and in the same direction. At the end of each screw 70 is a pillow block 74. The pillow block 74 limits the distance the nut 72 may travel and prevents the nut 72 from moving off the screw 70. The basculating arm 50 is attached to each nut 72 such that the basculating arm 50 moves in the same direction and distance as the nuts 72 themselves.

Figure 4:
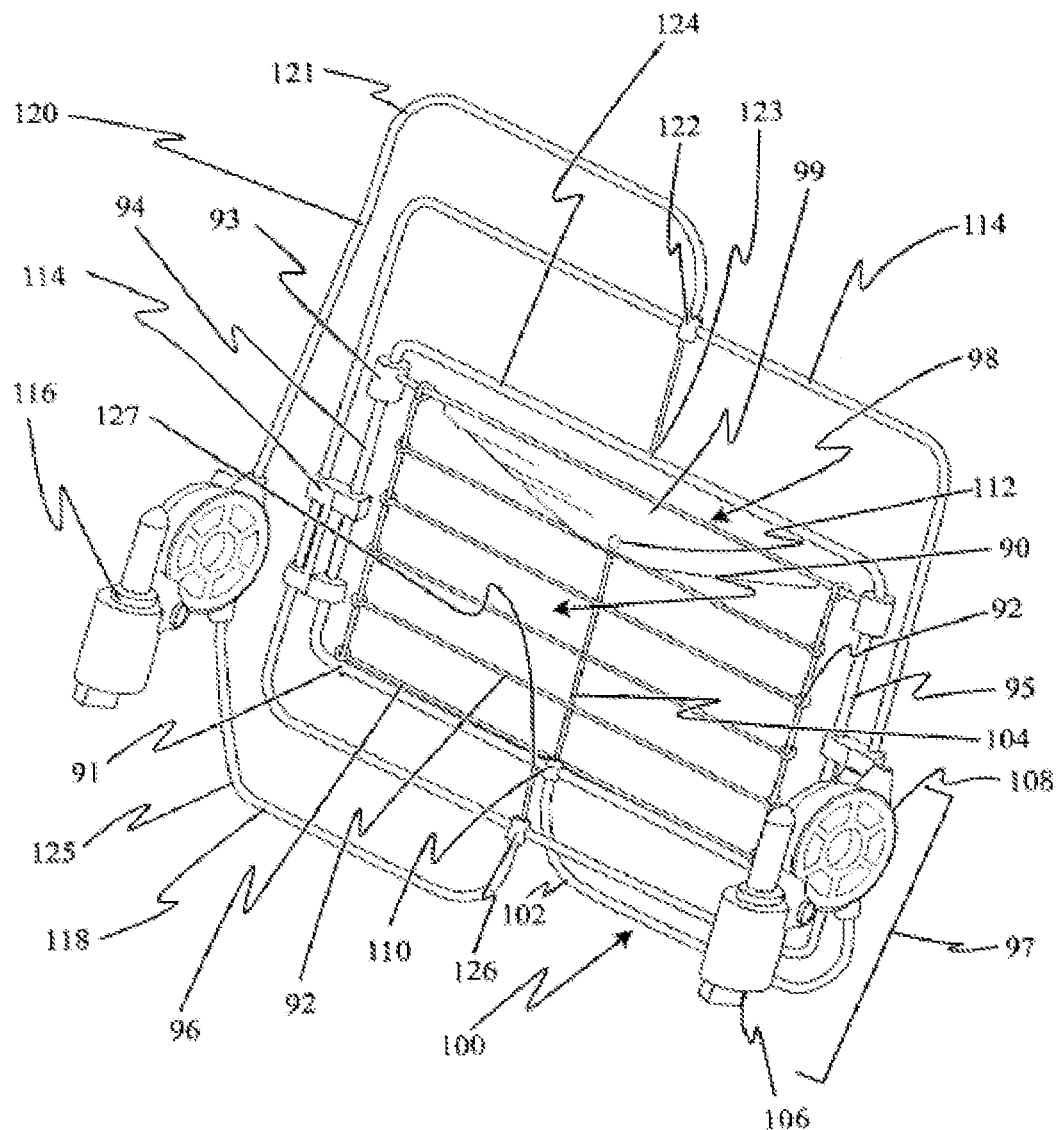
FIG. 4 is a front perspective view of a third embodiment of the present invention.

The final embodiment as shown in FIG. 4 does not use a basculating arm 50 to create the lumbar support. Rather, the lumbar support assembly contains an arching pressure surface 90. The arching pressure surface 90 consists of a wire array 92, guide rails 94 and 95, an upper horizontal mounting rod 98, a lower horizontal mounting rod 96, and an elevation rod 124. The wire array 92 used in this embodiment is substantially similar to that of the other embodiments except that this wire array includes a slide piece 99. The slide piece 99 is generally a solid piece of plastic or metal that is attached to the horizontal mounting rod 96 and forces the wire array 92 to form an arch when compressed. The slide piece 99, however, is not limited to this description and may take any shape, including being grooved, ribbed or hollow, and may be made of any material as long as it causes the wire array to arch when compressed.

The wire array 92 is mounted on guide rails 94 and 95 such that it may move relative to them for creating an arch which will support a seat occupant's lumbar spine. This relative motion may be achieved in a variety of ways, all within the scope of the present invention. In the depicted embodiment, the wire array 92 is mounted with a snap fit 91 at the lower horizontal mounting rod 96 and the upper horizontal mounting rod 98 such that it may pivot there. The upper horizontal mounting rod 98 is connected to the guide rails 94 and 95 with slide mounts 93 such that the upper horizontal mounting rod 98 may slide up and down the guide rails 94 and 95. The combination of pivoting motion around pivoting mounts 91 and sliding motion of slide mounts 93 along guide rails 94 and 95 allows the wire array 92 to be flexed into an arch as its upper end slides on the plane defined by the guide rails 94 and 95.

The in/out actuator 97 is connected to the wire array 92 by a Bowden traction cable 100. Bowden cable 100 is comprised of a cable sleeve 102 with a wire 104 disposed to slide through the sleeve 102. The in/out actuator 97, is disposed to apply traction to the Bowden cable wire 104 in order to slide it axially through the Bowden cable sleeve 102. In the depicted embodiment, the in/out actuator 97 is comprised of an electric motor 106 and a gear housing 108 containing the requisite components for applying the traction. Any of a variety of known power actuator gearing systems may be assembled with the lumbar support of the present invention without departing from the scope of the present invention.

The Bowden cable sleeve 102 is mounted at the lower horizontal mounting rod 96. This mount 110 is on the opposite end from the mount of the Bowden cable wire end 112, which is attached to the slide 99. Dynamic tension exerted by the traction applied by the actuator 97 pulls sleeve mount 110 and wire mount 112 towards one another, providing the pressure and traction necessary to force the wire array 92 into an arched position and further necessary for maintaining that position for support of the seat occupant's weight.

The arching pressure surface 90 is slideably connected to a fixed frame 114 and therefore can move vertically along the fixed frame 114. This vertical movement allows the seat occupant to adjust the height at which the lumbar support is provided. The up/down actuator 116 that provides the tension for this movement is connected to a down cable 118 and an up cable 120. The Bowden cable sleeve 121 of the up cable 120 is mounted to the top portion 122 of the fixed frame 114 and the wire end mount 123 is located on the elevation rod 124. Dynamic tension exerted by the up/down actuator 116 pulls the sleeve mount 122 and wire mount 123 towards one another thus moving the wire array 92 substantially vertically up the fixed frame 114. The Bowden cable sleeve 125 of the down cable 118 is mounted on the bottom portion 126 of the fixed frame 114 and the wire mount 127 is located on the lower horizontal mounting rod 96. Dynamic tension exerted by the up/down actuator 116 pulls the sleeve mount 126 and the wire mount 127 towards one another thus moving the wire array 92 vertically down the fixed frame 114 resulting in arching of surface 90.

In view of the forgoing it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A lumbar support for a transportation vehicle comprising:
    a flexmat adapted to mount on a seat backrest frame;
    a fixed frame pivotally attached to said flexmat such that said flexmat may extend from a first position closer to said fixed frame to a second position further from said fixed frame;
    a basculating arm having a raise rod and a lowering rod and being slidingly engaged with said fixed frame such that said basculating arm may travel substantially vertically along said fixed frame; and
    a double pulley attached to said basculating arm such that movement of said double pulley mediates movement of said basculating arm between a retracted and an extended position;
    wherein said basculating arm moves said flexmat from said first position to said second position as said basculating arm moves from said retracted to said extended position.

2. The lumbar support of claim 1 further comprising:
    a traction cable having a sleeve and having a wire disposed to slide axially within said sleeve, said sleeve and said wire each having a first end and a second end;
    said first ends of said sleeve and said wire being operatively engaged with an actuator for applying traction to said traction cable; and
    said second end of said wire being attached to said raise rod such that traction applied to said traction cable by said actuator moves said raise rod in order to move said basculating arm in a substantially vertical direction along said fixed frame.

3. The lumbar support of claim 2 wherein said actuator is a power actuator.

4. The lumbar support of claim 2 wherein said actuator is a manual actuator.

5. The lumbar support of claim 2 further comprising:
    a second traction cable having a sleeve and having a wire disposed to slide axially within said sleeve, said sleeve and said wire each having a first end and a second end;
    said first ends of said sleeve and said wire being operatively engaged with an actuator for applying traction to said traction cable; and
    said second end of said wire being attached to said lowering rod such that traction applied to said traction cable by said actuator moves said lowering rod in order to move said basculating arm in a substantially vertical direction along said fixed frame.

6. The lumbar support of claim 5 wherein said actuator is a power actuator.

7. The lumbar support of claim 5 wherein said actuator is a manual actuator.

8. The lumbar support of claim 1 further comprising:
    a traction cable having a sleeve and having a wire disposed to slide axially within said sleeve, said sleeve and said wire each having a first end and a second end;

said first ends of said sleeve and said wire being operatively engaged with an actuator for applying traction to said traction cable; and said second end of said wire being attached to one end of said double pulley such that traction applied to said traction cable by said actuator moves said double pulley in a first direction.

9. The lumbar support of claim 8 wherein said actuator is a power actuator.

10. The lumbar support of claim 8 wherein said actuator is a manual actuator.

11. A lumbar support for a transportation vehicle comprising:
a flexmat adapted to mount on a seat backrest frame, the flexmat extendable from a first position to a second position;
a basculating arm configured for movement along the flexmat to provide support at a plurality of heights along the flexmat; and
a double pulley attached to the basculating arm such that movement of the double pulley mediates movement of the basculating arm between a retracted and an extended position, wherein the basculating arm moves the flexmat from the first position to the second position as the basculating arm moves from the retracted to the extended position.

12. A lumbar support for a transportation vehicle comprising:
a flexmat adapted to mount on a seat backrest frame such that the flexmat may extend from a first position to a second position;
a basculating arm translatable along the flexmat;
an actuator for raising and lowering the basculating arm; and
a double pulley attached to the basculating arm such that movement of the double pulley mediates movement of the basculating arm between a retracted and an extended position, wherein the basculating arm moves the flexmat from the first position to the second position as the basculating arm moves from the retracted to the extended position.

13. The lumbar support of claim 11, further comprising:
a screw operatively engaged with a drive rod and a motor such that said motor rotates said drive rod and said drive rod rotates said screw; and
a nut threaded so as to operatively engage said screw, wherein the basculating arm is pivotally connected to the nut.

14. The lumbar support of claim 13, further comprising:
a traction cable having a sleeve and having a wire disposed to slide axially within said sleeve, said sleeve and said wire each having a first end and a second end;
said first ends of said sleeve and said wire being operatively engaged with an actuator for applying traction to said traction cable; and
said second end of said wire being attached to said double pulley such that traction applied to said traction cable by said actuator moves said double pulley in a first direction.

15. The lumbar support of claim 12, further comprising:
a screw operatively engaged with a drive rod and a motor such that said motor rotates said drive rod and said drive rod rotates said screw; and
a nut threaded so as to operatively engage said screw, wherein the basculating arm is pivotally connected to the nut, 16. The lumbar support of claim 15, further comprising:
a traction cable having a sleeve and having a wire disposed to slide axially within said sleeve, said sleeve and said wire each having a first end and a second end;
said first ends of said sieeve and said wire being operatively engaged with the actuator for applying traction to said traction cable; and
said second end of said wire being attached to said double pulley such that traction applied to said traction cable by said actuator moves said double pulley in a first direction.

\* \* \* \* \*